Jan. 4, 1966  H. WOELK  3,227,593
METHOD OF PRODUCING A MULTIPLE-PANE INSULATING GLASS
Filed Jan. 16, 1961
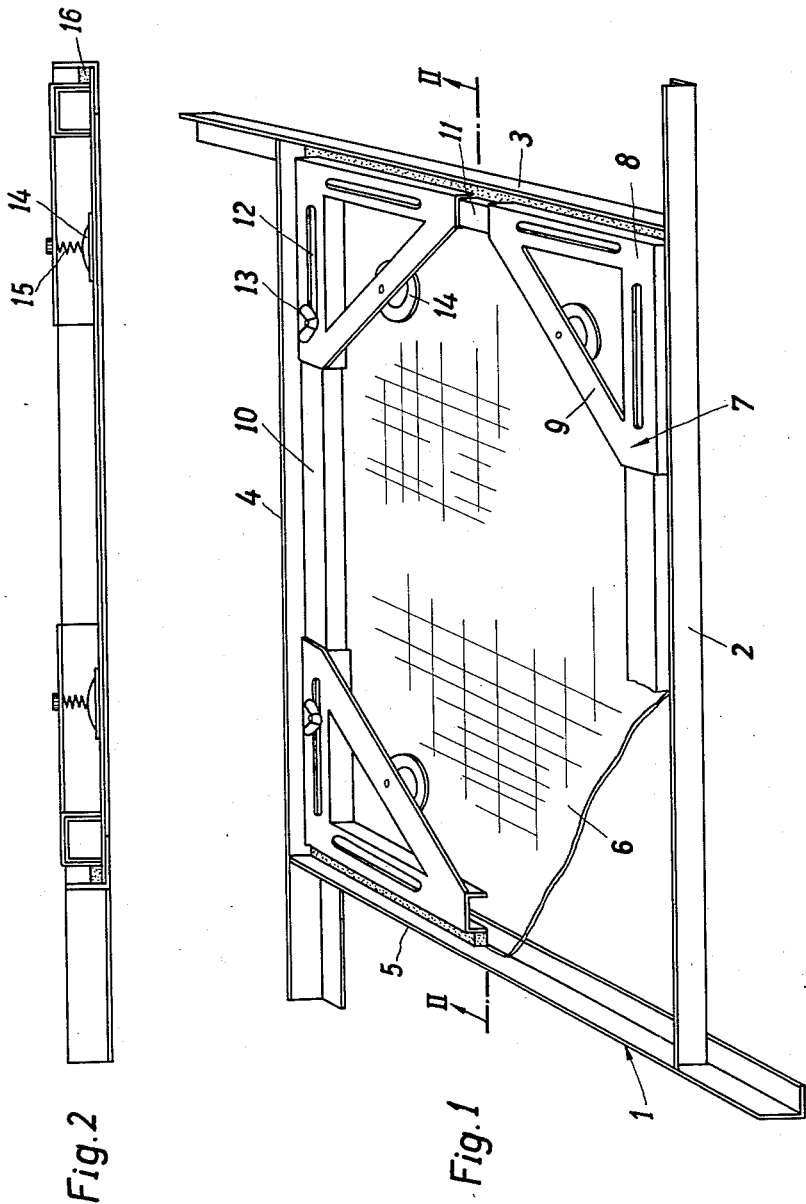
Hubert Woelk
Inventor
by Mason, Porter, Diller & Stewart
Attorneys United States Patent Office 3,227,593
Patented Jan. 4, 1966

3,227,593
METHOD OF PRODUCING A MULTIPLE-PANE INSULATING GLASS
Hubert Woelk, Porz-Zundorf, Germany, assignor to Spiegelglaswerke Germania Aktiengesellschaft, Porz-Urbach, Germany
Filed Jan. 16, 1961, Ser. No. 83,063
Claims priority, application Germany, Jan. 19, 1960, S 66,696
3 Claims. (Cl. 156—104)

This invention relates to the preparation of multiple-pane insulating glass of the kind which is coming into increasing use for glazing apartments, office blocks, factory buildings and motor vehicles.

In the known multiple-pane insulating glasses a connection between the edges of adjacent panes is provided either by melting the glass of such edges or by soldering metal webs to the pretreated pane edges or by introducing metal frames or metal sections which are struck or rigidly secured on intermediate webs made of other substances, such as wood, plastic, glass or the like, or by introducing self-adhesive thermoplastic sections and by joining the same to the glass edges by melting. A disadvantage common to all these procedures is that they require the use of preshaped webs or sections and are complicated and costly because of the initial work which must be done. Nor can the methods described be used to prepare multiple-pane insulating glass prepared from cast glass having a considerable embossing—including an embossing on one side—if the embossing is to be placed inwards, a feature desirable to keep the article clean.

It is also known to form the webs between adjacent panes, the pane edges being dipped into a trough filled with a liquid settable compound, by the liquid bonding agent being hardened in the trough, the panes being interconnected along one edge. This method is complicated because the spaced-apart panes must be turned or dipped as many times as they have edges, nor can this method be used to interconnect panes which are curved arcuately along their periphery.

On the other hand, the invention proposes a method of preparing multiple-pane insulating glass comprising webs disposed between the edges of adjacent panes which is much simpler and cheaper than the methods hereinbefore specified and which can be used to prepare multiple-pane insulating glasses, the panes of which have a variety of geometric shapes. In the method according to the invention, a closed frame having the required web cross-section and consisting of a settable substance which becomes rigidly secured to the pane is poured onto one of the two panes along the edges thereof, and the second pane is stuck to the top of the frame thus formed, preferably the same casting compound or a different adhesive being used to stick the second pane.

According to the invention, the frame serving as connecting web is cast preferably from a loaded epoxy resin which is hardened by polyamides containing still free amino groups and to which additives such as thiocols, phenol resins, methacrylic acid ester or other high-boiling-point plasticising substances have been added. Alternatively, such frame can be cast from other substances which stick to glass, such as polyester resins or the like.

According to the invention, to cast the closed frame serving as connecting web between the two panes a casting mould is formed, the outer wall of which engages tightly around the edge of the pane to be treated, the casting mould inner wall being placed tightly on the pane and the casting mould base consisting of the pane edge strip disposed between said outer wall and said inner wall, after which the casting mould has the frame compound poured into it and is removed after such compound has hardened. According to the invention, the frame which is formed on one pane and which serves as a web for connection to the adjacent pane is coated on the top, after setting, with the same liquid casting compound as has been used to prepare the frame or with some other adhesive, after which the second pane is stuck to the frame; if required, however, the compound which is poured onto one pane and which serves to form the frame-like connecting web hardens in different ways, the top layer setting last, while the other pane is stuck to the web before the top layer has set.

Finally, to carry the method hereinbefore described into effect the invention provides an apparatus comprising two lengthwise and transversal adjustable frames, one of which tightly surrounds the pane to be treated, while the other can be placd upon such pane inide the first frame and at a lateral distance therefrom, the second frame being secured to the pane preferably by vacuum cups borne by the second frame. Advantageously, to accelerate the setting of the casting compound the same is either heated from above by infra-red radiators or, and preferably, the outer and/or inner frame are or is heated, to which end either heating windings are included in such frames or the actual frames take the form of electrically heatable resistance elements.

An embodiment of an apparatus for carrying out the process according to the invention is diagrammatically illustrated in the drawings wherein:

FIG. 1 is a perspective view of the apparatus, whilst
FIG. 2 is a sectional view taken through the apparatus taken along the line II—II of FIG. 1.

The apparatus comprises an outer frame 1 consisting of frame members 2, 3, 4 and 5 which are disposed at right angles to one another, which are movable relatively to one another and which are in right-angled cross-section. The frame members 2, 3, 4 and 5 can be moved appropriately in relation to one another to make the frame 1 of a size such that it tightly surrounds a glass pane 6 to be treated, the pane 6 being placed on the horizontal portions of the angled frame members 2, 3, 4 and 5. The same, the vertical parts of which project above the pane 6, are rigidly interconnected in this position by screws or other means.

An inner frame 7 comprises four right-angled corner members 8, U-shaped in cross-section which are strengthened by struts 9, and four extension bars 10, 10, 11, 11 around which the U-cross-sections of the members 8 engage. The members 8 at the top with slots 12 through which extend screwthreaded pins borne by the bars 10, 11 and provided with wing nuts 13 and serving to locate the members of the frame 7 in a required position. Fitted to the bottom of the struts 9 are vacuum cups 14 which are compressed by springs 15 secured to the struts 9. The inner frame 7 is given a size which is geometrically similar to the outer frame 1 and which is such that, when the inner frame is clamped by the vacuum cups 14 to the pane, a very uniformly wide trough remains between the frame 1 and the frame 7. Such trough, the base of which is formed by the pane edge strips lying between the two frames 1 and 7, now receives the hardenable compound which is used to form a web 16 in the multi-pane insulating glass.

As pouring compound there can be used all the cold or hot setting substances which stick to glass satisfactorily, have a coefficient of expansion of the same order of magnitude as glass, are resistant to water and weathering and have when set a resilience, at temperatures of from −30° to +100° C. and possibly more such that the web can withstand changes in the shape of the glass arising out of changes in atmospheric temperature and pressure. Very satisfactory results have been achieved with loaded epoxy resins which are set by polyamides containing free amino groups and which are given additives such as thiocols, phenol resins, methacrylic acid esters or other high-boiling-point plasticising substances. If it is required to harden the closed frame-like web 16 at elevated temperature, the compound forming the web can, as already specified, be heated either from above, by means of infra-red radiators, or by heating outer and/or inner frame 1 or 7. Once the poured-in compound has hardened sufficiently, the inner frame 7 is removed, after which the frame-like web and/or the pane to be stuck thereto is coated with an appropriate adhesive which is preferably made of the same compound as the web. The adhesion is performed after a pressure-equalising aperture has been pierced in the web. The air between the panes is dried in known manner, for instance, by dried air being blown in. The vent holes are closed with a rapid-setting loaded unsaturated polyester resin. Panes of any geometrical shape can be joined to one another by means of the method according to the invention. The invention can also be applied to the joining together of panes having a surface other than planar; for instance, the inner frame which helps to form the trough can be provided with an insert of foamed substance which prevents the casting compound from creeping. The method according to the invention is of use not only for sticking glass to glass at a particular separation but also for sticking glass to other substances or for sticking such other substances to one another.

I claim:

1. The method of producing a double-pane insulating glass which comprises enclosing one glass pane within an outer surrounding frame, locating a second inner frame on said pane, with its edges equally spaced from the outer frame temporarily attaching the inner frame to the said last pane, casting an adherent plastic web on the glass between said frames, removing the frames, and applying a second pane adhesively to the surface of said web.

2. The method of producing a double-pane insulating glass which comprises enclosing one glass pane within an outer surrouding frame, locating a second inner frame on said pane, with its edges equally spaced from the outer frame temporarily attaching the inner frame to the said last pane, casting an adherent plastic web on the glass between said frames, removing the frames, and applying a second pane adhesively to the surface of said web and simultaneously exhausting the air between said panes.

3. The method of producing a double-pane insulating glass which comprises enclosing one glass pane within an outer surrounding frame, locating a second inner frame on said pane, with its edges equally spaced from the outer frame, temporarily attaching the inner frame to the said last pane, casting an adherent plastic web on the glass between said frames causing said web to set in place, removing the frames, and applying a second pane adhesively to the surface of said web.

References Cited by the Examiner

UNITED STATES PATENTS

| | | | |
|---|---|---|---|
| 2,038,771 | 4/1936 | Stroud | 154—28 |
| 2,094,381 | 9/1937 | Slayter | 154—45 |
| 2,138,164 | 11/1938 | Haven | 154—28 |
| 2,143,747 | 1/1939 | Watkins | 154—28 |
| 2,705,223 | 3/1955 | Renfrew et al. | |
| 2,887,424 | 5/1959 | Langberg | 156—99 XR |
| 2,966,435 | 12/1960 | Kassinger | 154—45 |

EARL M. BERGERT, *Primary Examiner.*

CARL F. KRAFFT, *Examiner.*